(12) United States Patent
Fischer et al.

(10) Patent No.: US 6,858,262 B2
(45) Date of Patent: *Feb. 22, 2005

(54) METHOD FOR PRODUCING A SURFACE-ALLOYED CYLINDRICAL, PARTIALLY CYLINDRICAL OR HOLLOW CYLINDRICAL COMPONENT AND A DEVICE FOR CARRYING OUT SAID METHOD

(75) Inventors: Alexander Fischer, Swisttal (DE); Joachim Kahn, Ehringshausen (DE); Franz Josef Feikus, Bonn (DE)

(73) Assignee: VAW aluminium AG, Bonn (DE)

(*) Notice: Subject to any disclaimer, the term of this patent is extended or adjusted under 35 U.S.C. 154(b) by 0 days.

This patent is subject to a terminal disclaimer.

(21) Appl. No.: 10/019,812

(22) PCT Filed: Feb. 21, 2001

(86) PCT No.: PCT/EP01/01932

§ 371 (c)(1),
(2), (4) Date: May 22, 2002

(87) PCT Pub. No.: WO01/64385

PCT Pub. Date: Sep. 7, 2001

(65) Prior Publication Data

US 2002/0164436 A1 Nov. 7, 2002

(30) Foreign Application Priority Data

Feb. 28, 2000 (DE) .......................................... 100 09 250
Feb. 28, 2000 (DE) ..................................... 200 03 515 U

(51) Int. Cl.$^7$ .......................... B05D 3/06; B23K 26/073; B23K 26/08; B23K 26/00
(52) U.S. Cl. ....................... 427/554; 427/556; 427/597; 219/121.64; 219/121.8; 219/121.84
(58) Field of Search ................................ 427/551, 553, 427/554, 559, 597, 596; 118/641; 219/121.64, 121.65, 121.66, 121.76, 121.77, 121.78, 121.8, 121.84

(56) References Cited

U.S. PATENT DOCUMENTS 4,832,982 A * 5/1989 Mori et al.

(List continued on next page.)

FOREIGN PATENT DOCUMENTS

DE 197 11 232 C1 4/1998

(List continued on next page.)

Primary Examiner—Marianne Padgett
(74) Attorney, Agent, or Firm—Proskauer Rose LLP

(57) ABSTRACT

The invention relates to a method for manufacturing a surface-alloyed cylindrical, partly cylindrical or hollow cylindrical structural member where in the zone of incidence of the energy beam there is formed a locally bounded melting bath with a heating and melting front, a solution zone and a solidification front. At the side of the energy beam the hard material powder is deposited via a conveyor device in the direction of gravity and is supplied co-ordinated with the feed movement of the workpiece in a width which corresponds to the width of the linear focus and a layer height of 0.3–3 mm is thereby produced. The hard-material powder supplied to the workpiece surface in the heating front of the melting bath is heated by an energy beam at a wavelength of 780–940 nm and in contact with the liquefied matrix alloy the powder is immediately dissolved in the melting bath. Convection is produced in the solution zone by the energy beam having a specific power of at least $10^4$ W/cm$^2$, so that the homogenization process in the melting zone is accelerated, where the linear focus acts on the solution zone until the hard material powder is uniformly distributed in the melting bath. In front of the energy beam the uniformly distributed powder material, which has gone into solution metallurgically in the solution zone, is subjected to directional solidification in the solidification front at a high cooling rate of 200–600 K/s at a feed rate of 500–10,000 mm/min. The invention also relates to a device for implementing the method, consisting of a workpiece clamping device, on which a workpiece is aligned and clamped above index holes and/or above working surfaces, onto whose surface a powder supply and a focusable beam from a beam head are directed.

11 Claims, 9 Drawing Sheets

U.S. PATENT DOCUMENTS

| | | | | |
|---|---|---|---|---|
| 5,038,014 | A | * | 8/1991 | Pratt et al. ............. 219/121.64 |
| 5,405,660 | A | * | 4/1995 | Psiuk et al. ................. 427/597 |
| 5,431,967 | A | | 7/1995 | Manthiram et al. |
| 5,447,910 | A | * | 9/1995 | Hayashi et al. ............. 427/596 |
| 5,837,960 | A | | 11/1998 | Lewis et al. |
| 6,203,861 | B1 | * | 3/2001 | Kar et al. .................... 427/554 |
| 6,221,175 | B1 | * | 4/2001 | Kurz et al. ................. 427/597 |
| 6,284,067 | B1 | * | 9/2001 | Schwartz et al. ........... 427/597 |
| 6,299,707 | B1 | * | 10/2001 | McCay et al. ............. 427/597 |
| 6,303,897 | B1 | | 10/2001 | Bady et al. |
| 6,316,065 | B1 | * | 11/2001 | Wallmann .................... 427/596 |
| 6,390,050 | B2 | * | 5/2002 | Feikus ..................... 123/193.2 |
| 6,548,125 | B2 | * | 4/2003 | Warnecke .................. 427/597 |
| 6,575,130 | B2 | * | 6/2003 | Feikus ..................... 123/193.2 |
| 6,713,191 | B2 | * | 3/2004 | Feikus et al. ............... 428/654 |
| 6,797,916 | B2 | * | 9/2004 | Feikus ................... 219/121.65 |
| 2002/0153359 | A1 | * | 10/2002 | Feikus ..................... 219/121.6 |
| 2004/0099644 | A1 | * | 5/2004 | Allen .................... 219/121.64 |

FOREIGN PATENT DOCUMENTS

| | | | |
|---|---|---|---|
| DE | 198 17 091 A | | 10/1999 |
| JP | 357185927 A | * 11/1982 | ................. 427/597 |
| JP | 361074326 A | * 4/1986 | ................. 427/596 |
| WO | WO 97 10067 A | | 3/1997 |
| WO | WO 98 56566 A | | 12/1998 |

\* cited by examiner force of gravity
⊗

METHOD FOR PRODUCING A SURFACE-ALLOYED CYLINDRICAL, PARTIALLY CYLINDRICAL OR HOLLOW CYLINDRICAL COMPONENT AND A DEVICE FOR CARRYING OUT SAID METHOD

BACKRGOUND OF THE INVENTION

The invention relates to a method for manufacturing a surface-alloyed cylindrical, partly cylindrical or hollow cylindrical structural member where an energy beam having a linear radiation area, hereinafter called a linear focus, is directed onto a workpiece surface whereby the workpiece surface is melted and a hard-material or alloy powder is fed into the molten surface, and a device for implementing the method.

WO 97/10067 discloses a method for coating metal workpieces in which metal-containing powder is melted using a laser beam and deposited into the surface of the metal workpiece. According to Claim 1 of the WO document, the powder should be fed into the melting region coaxially to the laser beam and distributed over a fairly large area in the form of 0.1 to 1 mm wide tracks.

In order to implement the disclosed method according to a preferred example of embodiment of WO 97/10067 there is a device for supplying powder coaxially to a laser beam focussing head which can be moved relative to one other along three axes. However the moveability is limited only because of the necessary control technology.

For a coating plant which is to be used industrially track widths of 0.1 to 1 mm are uneconomical and devices moveable along three axes are too expensive. In addition, larger areas such as, for example, the inner bearing surfaces of cylinder walls, cannot be coated directly using the known device.

Bearing surface treatment installations are known for applying a coating to inner bearing surfaces, consisting of a rotatable clamping device for a cylinder block, a laser treatment unit with a beam head which is connected to a powder supply device, and a transfer unit which positions the cylinder block in front of the laser treatment unit, and a drive for moving the transfer unit along a transfer axis.

For these bearing surface treatment installations high requirements are imposed on the precision regarding the alignment of the installation parts and their wear behaviour since the engine blocks manufactured using these are later fitted with separately manufactured pistons and for cost reasons expensive after-treatment should be avoided if possible.

SUMMARY OF THE INVENTION

The object of the present invention is to develop an economical surface treatment method for cylindrical or partly cylindrical surface shapes, which can be used industrially, with which a tribologically optimised heat-treatable hollow cylindrical blank can be favourably manufactured. The new device for implementing the method should operate with a high accuracy and should make it possible to achieve good adjustability for the various process parameters.

This object is solved according to the invention by the features specified in the Claims. In numerous tests it was established that a high accuracy and lower wear behaviour of the bearing surface treatment installation and the parts produced thereon can be achieved if 1. The clamping plane of the clamping device 1 is aligned parallel to the beam direction of the laser unit 3,
2. The laser unit 3 can be moved perpendicular to the clamping plane of the clamping device 1, where the beam direction is aligned perpendicular to the transfer axis 10 at an angle a <45° to the gravity vector, and
3. The powder feed 5 either opens directly into the beam direction of the laser unit 3 or (seen in the feed direction) shortly before the beam incidence zone 12.

For favourable-cost treatment in the bearing surface treatment installation it is provided that a laser treatment unit 3 consists of several beam devices or one device with a split beam which can be inserted in a cylinder bore where several treatment zones are provided one after the other (seen in the direction of the cylinder axis) on the cylinder wall.

Further the production capacity of the bearing surface treatment installation can be improved if the powder supply device 5 consists of several feed devices of the same number as treatment zones, which can be inserted in a cylinder bore where the feed apertures are arranged one after the other (seen in the direction of the cylinder axis).

The method according to the invention consists in a combination of a) Linear focus with line widths greater than 4 mm transverse to the feed direction,
b) High-energy beam having a wavelength between 780 and 940 nm and a
c) Powder feed can be produced with a rotation about a longitudinal axis transverse to the direction of gravity (hereinafter defined as "downhand position") associated with a specific energy input of 5,000–600,000 $W/cm^2$.
d) The cooling rate of 200–600 K/s helps to achieve controlled Si grain distribution and the formation of silicon primary crystals with phase diameters of up to 80 $\mu$m in the eutectically solidifying residual melt.

The process step e) means that the hard material, e.g. the silicon must be completely dissolved in the melting bath.

The duration depends on the specific laser power. If the linear focus acts for too long, pore formation occurs as a result of evaporation of the aluminium or the matrix alloy and the hard materials can clump together.

The feed rate should be less than 10,000 mm/min according to process step f) otherwise the input energy is not sufficient for entry of the hard material into the melt. At the given power the laser beam should be coupled into the matrix with an energy yield of 40–60%. If the cooling rate is too high >600 K/sec, the solution time is not sufficient for the hard material whereas below 200 K/sec cracks appear in the alloying zone since too much hard material goes into solution.

In a preferred embodiment of the invention several energy beam units can be used as further parameters to control the structural properties by spatially variable cooling rates.

By this means it is possible to set spatially different surface hardnesses which allow purely mechanical further treatment and final treatment. If the surface hardness is greater than 160 HV, honing can be carried out using diamond without scoring and without smearing. Then in a further treatment process the silicon primary crystals or other hard materials of >1 $\mu$m diameter can be exposed purely mechanically on the surface by removing <1 $\mu$m.

According to a preferred example of embodiment, the linear focus should be directed onto the surface to be alloyed in a double track one after the other (relative to the feed direction) so that a partial heat treatment can be achieved by hardening, recrystallisation, lengthening the precipitation time, homogenisation and phase coarsening of the precipitates.

According to another preferred case of application the powder components can also be applied in a double track so that different compositions and rates of application are possible here, e.g. the build-up of gradient materials with controlled alloy formation.

A controllable aperture which serves to lengthen or shorten the linear focal width seen in the feed direction can be used in a preferred fashion to start up and switch off the coating device.

Unlike the known coating device according to DE 198 17 091 A1 (NU TECH/VAW motor GmbH), an energy beam device moveable along one axis and a structural member moveable along multiple axes is used here. Of particular advantage here is that the rotation speed of the workpiece is variable in order to achieve a coarse-phase structure (by slow rotation) or a fine-celled or fine-phase structure (by faster rotation) at the same energy input.

As has already been mentioned, a double track can be used to alloy various types of alloy. The powder can be applied to the surface of the workpiece in a single stage (a single powder beam) or in several stages (several powder beams) via suitably shaped powder slit nozzles. The linear focal width is at least 4 mm, preferably 5 to 15 mm.

A particular feature of the method according to the invention is that variable penetration depths between 100–2500 µm can be achieved by varying the feed rate and/or by surface-related energy input. A diode laser with the wavelength range specified in the Claim is preferably used for improved coupling which, in conjunction with a previously applied hard-material powder and hard-material-containing powder, especially Si or Si-containing powder, can achieve excellent heat input deep inside the structural member.

BRIEF DESCRIPTION OF THE DRAWINGS

The invention is explained in greater detail subsequently with reference to several examples of embodiment. The drawings are as follows.

DETAILED DESCRIPTION OF THE INVENTION

Figure 1:
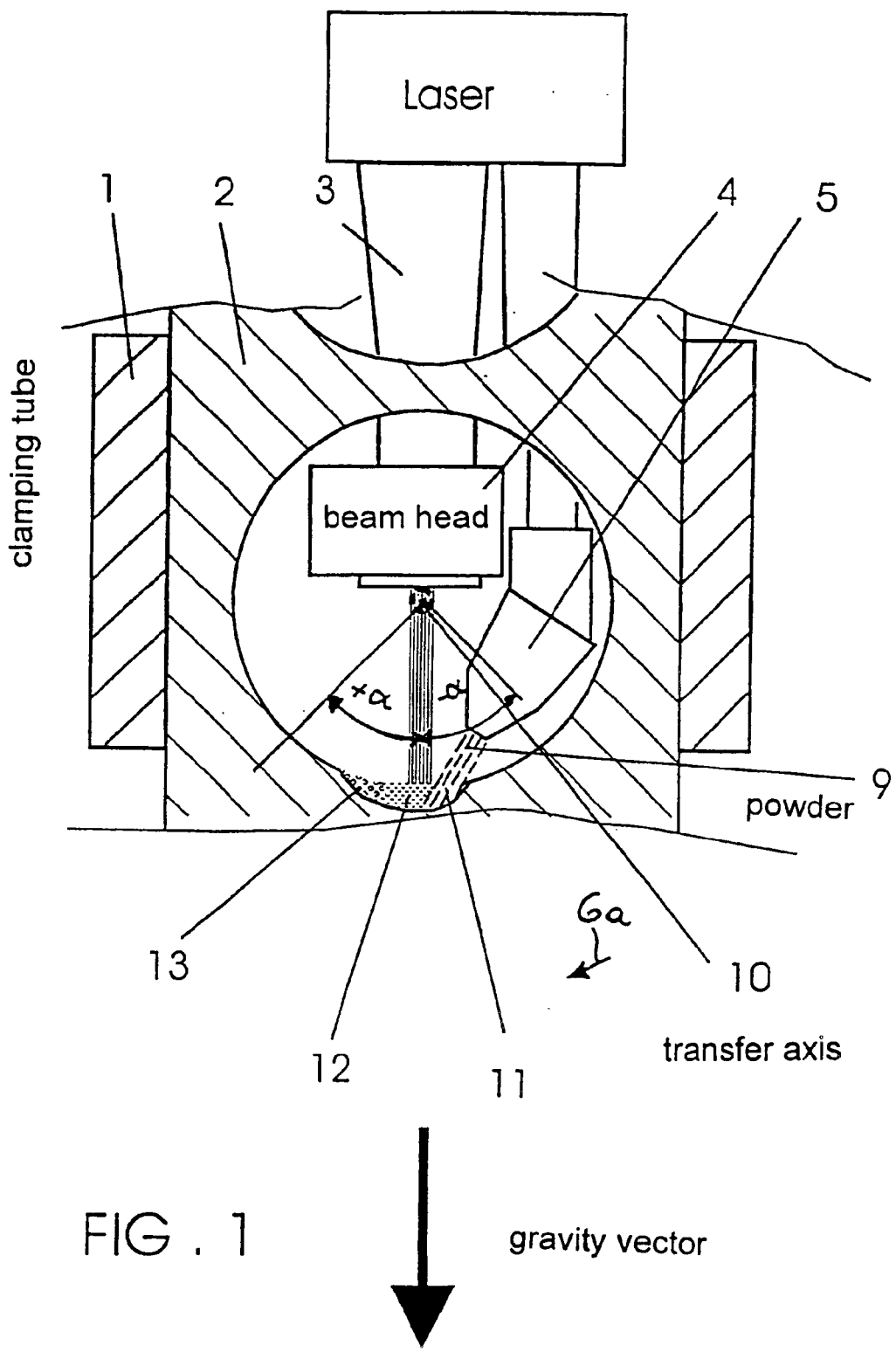
FIG. 1 Cross-section through a bearing surface treatment installation according the invention during the treatment of a cylinder block, FIG. 2 Longitudinal section through a bearing surface treatment installation according the invention during insertion into a four-cylinder in-line engine block, FIGS. 3–5 Enlarged views of section X in FIG. 2, FIG. 6 Cross-section as in FIG. 1 with two beam heads, FIG. 7 Schematic diagram to explain the method of manufacture according to the invention, FIG. 8 Longitudinal section through a bearing surface treatment installation according the invention with powder supplied via a vibrating conveyer chute, FIG. 9 Cross-section along AA in FIG. 8, FIG. 10 Enlarged section Y from FIG. 8, FIG. 11 Principle of a screw conveyer similar to FIG. 1.

FIG. 1 shows a cylinder block 2 of a four-cylinder inline engine clamped in a clamping device 1 such that the longitudinal axis of the in-series engine is in the direction of the gravity vector.

A laser treatment unit 3 projects with the beam head 4 into the bore of the cylinder block 2. The beam head can be moved in the direction of a transfer axis 10 (perpendicular to the plane of the drawing).

From the beam head 4 a laser beam emerges in the direction of gravity, which impacts on the surfaces of the cylinder wall in the beam incidence zone 12 and there forms a heating zone 11, a melting zone 12 and a solidification zone 13.

A powder supply device 5 also opens out in the vicinity of the beam incidence zone, applying a powder jet 9 either directly in the beam direction or, seen in the feed direction, shortly before the point of incidence of the laser beams onto the cylinder wall to be treated. The application of the powder can be used to influence the structural properties both from the alloy point of view and also from the type of structure formation. This is achieved, for example, by the type and quantity of powder supplied.

In a variant not shown several powder supply devices can be inserted simultaneously in the cylinder bore. The laser treatment can also be accomplished using several beam heads at the same time.

Figure 2:
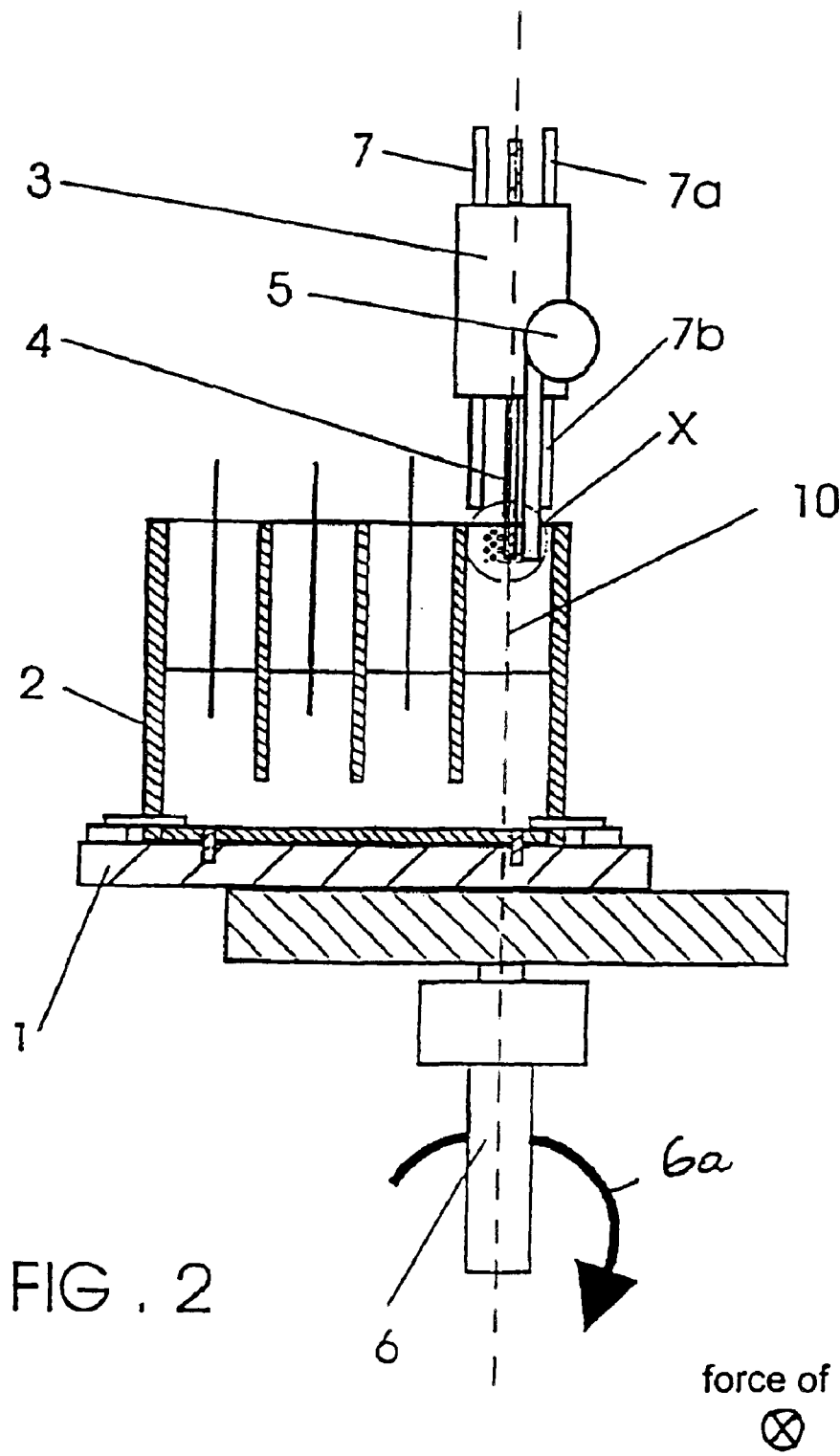

FIG. 2 shows a bearing surface treatment installation constructed according to the invention in a four-cylinder in-line engine. The cylinder block 2 can be seen in the longitudinal section, i.e. perpendicular to the plane of the drawing in FIG. 1. The clamping device 1 is located on a clamping table 1a and a turntable 1b which is connected to a drive 6 to move the transfer unit along a transfer axis 10.

The direction of the arrow 6a indicates the direction in which the engine block 2 is turned during treatment. Here it is important that the powder supply device 5 is positioned in front of the laser head 4, as shown in FIG. 2, section X.

The insertion movement of the laser head 4 into the cylinder bore is accomplished via a spindle 7. Axial parallelism between the axis of the cylinder bore and the axis of rotation 10 is important to maintain manufacturing tolerances. This is ensured by the carriage guides 7a, 7b on which the laser treatment unit 3 is moved in and out of the cylinder block two over corresponding counterguides.

Figure 3:
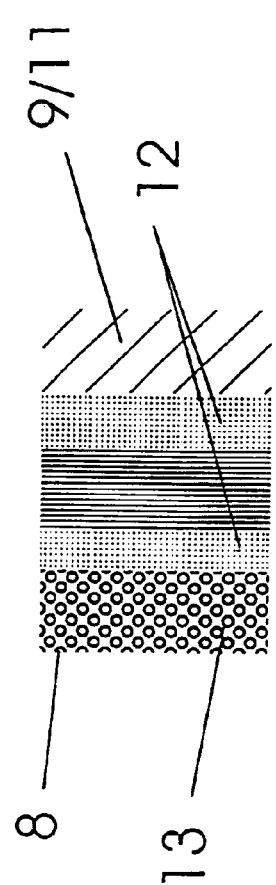
Figure 4:
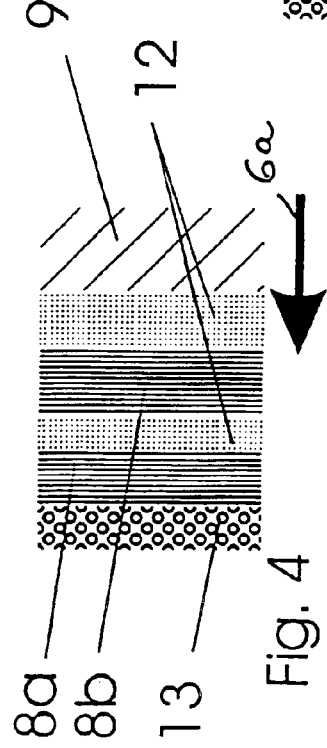
Figure 5:
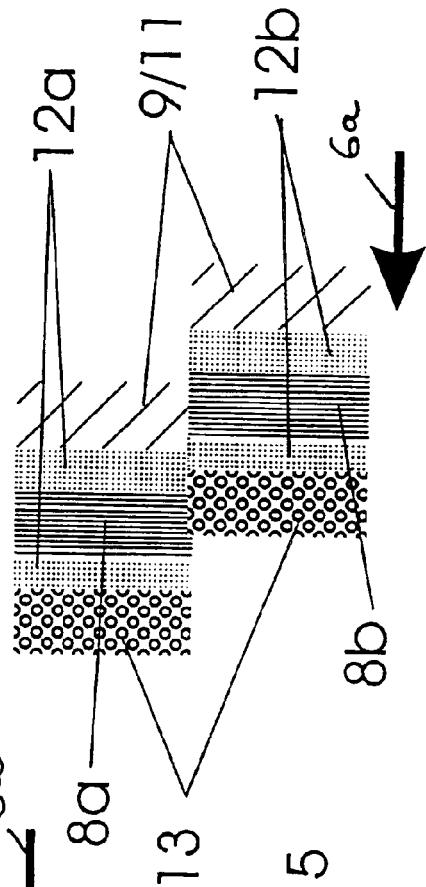

The cross-section enlargements in FIGS. 3–5 again shown the heating zone 9/11, the melting zone 12 and solidification zone 13 in an enlarged view. The surface extension of the various zones or regions can be influenced by the rotation speed of the cylinder block 2, the movement of the transfer unit along the transfer axis 10 and by the number of laser treatment devices or beam devices and powder supply devices.

Whereas in FIG. 3 there is only one focal spot 8 for the single laser beam head 4, FIG. 4 shows two focal spots 8a, 8b. For this purpose the laser treatment unit can be fitted with two beam units according to Claim 13.

Figure 6:
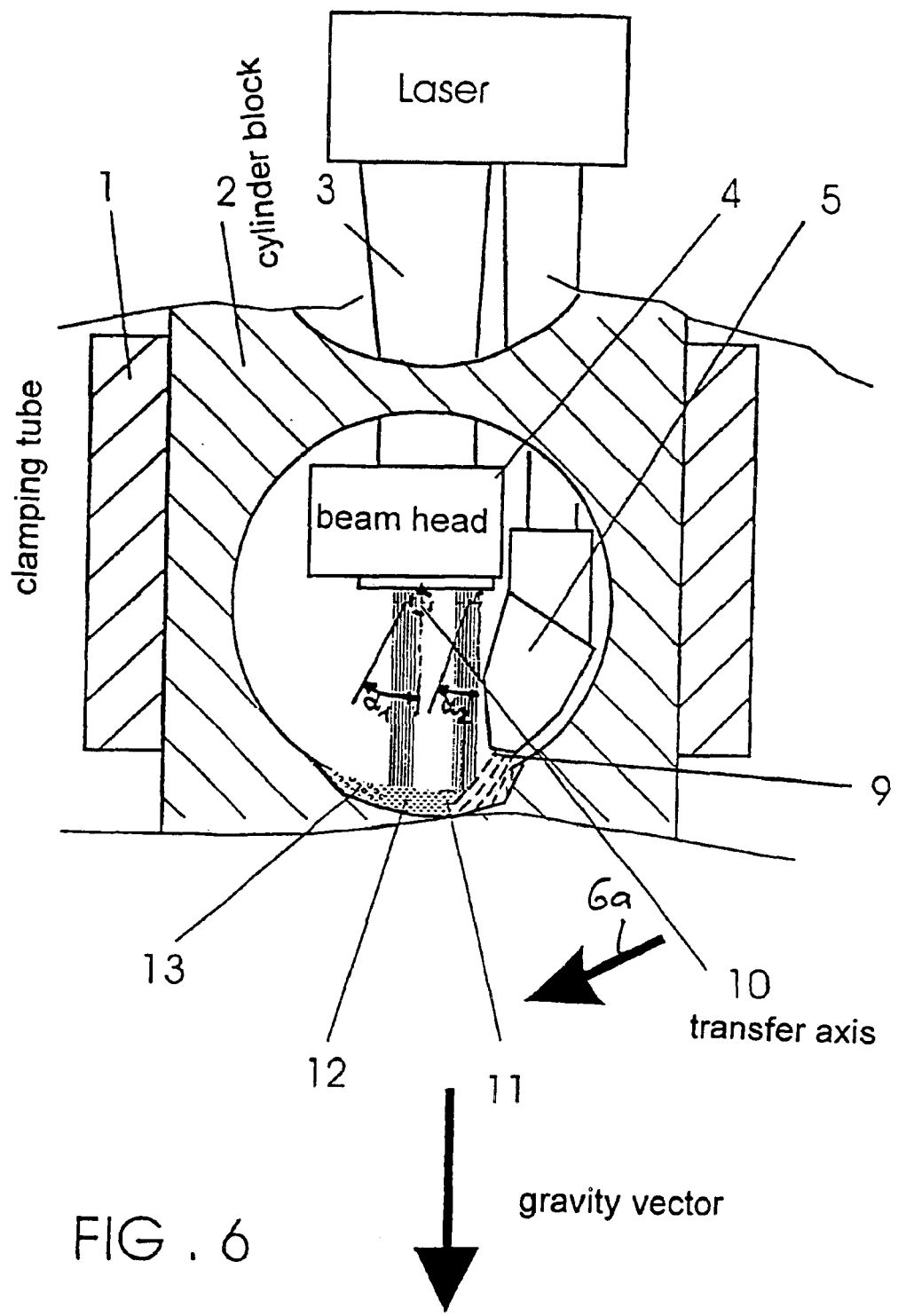

FIG. 5 shows a double track with two staggered focal spots 8a, 8b and two melting and solidification fronts 12, 13 in each case. This variant requires a multiple powder supply as described in Claim 14 and as shown in FIG. 6. The reference symbols 9/11 denote the powder supply in the preheating zone. Since the beam heads 4.1 and 4.2 can pivot, the pivot angles are given as $a_1$ and $a_2$.

Figure 7:
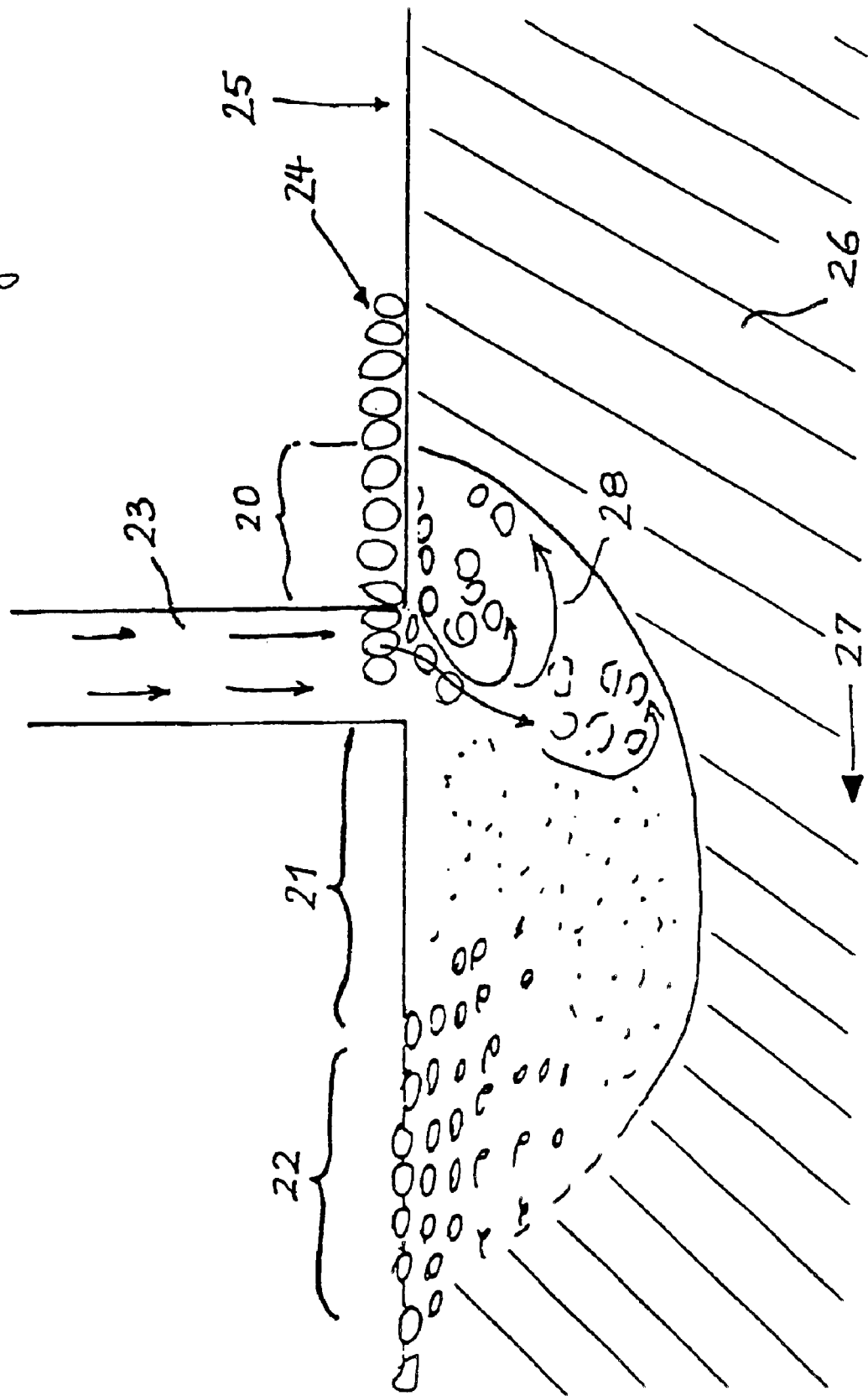
Figure 8:
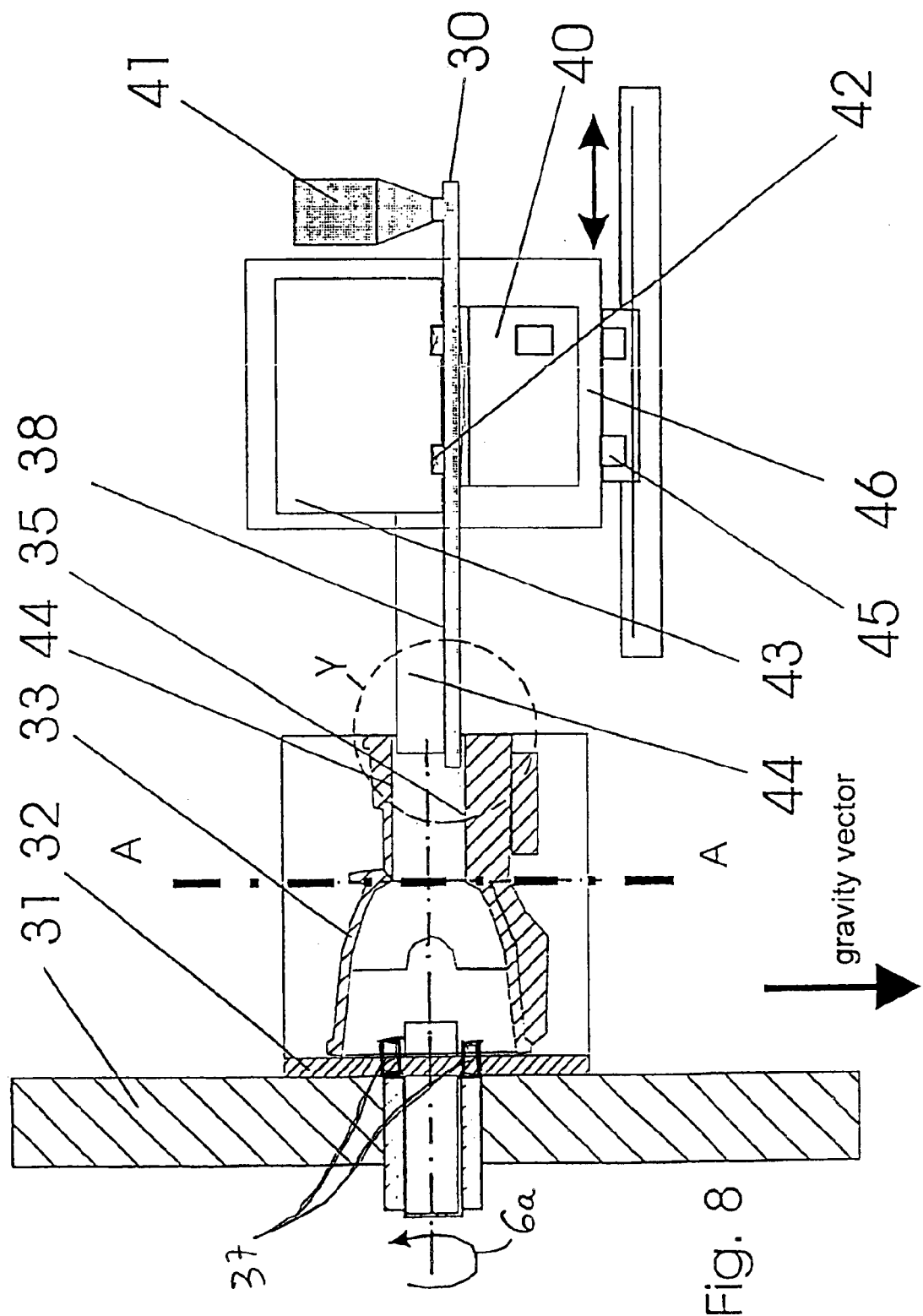

FIG. 7 is a schematic showing the method according to the invention for manufacturing a surface-alloyed cylindrical or partly cylindrical structural member. It involves first directing an energy beam having a linear beam area (also called a linear focus) onto a workpiece surface. The workpiece surface is thereby melted and a hard material or alloy powder is fed into the molten surface.

As shown in FIG. 7, in the zone of incidence of the energy beam there forms a locally bounded melting bath with a heating and melting front 20, a solution zone or remelting zone 21 and a solidification front 22.

At the side of the energy beam 23 a quantity of powder 24 is applied to the surface of the structural member 26 in the direction of gravity. The quantity of powder 24 is coordinated with the feed movement 27 of the workpiece or structural member 26, where the width of the powder jet transverse to the plane of the drawing in FIG. 7 approximately corresponds to the width of the energy beam 23 (also measured transverse to the plane of the drawing).

It can be seen from FIG. 7 how the powder supplied to the workpiece surface is heated in the solidification front and then dissolved at the latest in the energy beam 23 in the melting bath. Tests have shown that at a wavelength of 780 to 940 nm the coupling of the energy beam into the metal matrix is optimised but also the powder undergoes optimised rapid heating and is dissolved in the melt in contact with the liquefied matrix alloy.

As shown by the arrows 28 in FIG. 7, convection takes place in the solution zone so that the homogenisation process is accelerated in the melting zone. This is made possible by the energy beam having a specific power of at least $10^4$ W/cm$^2$. It can be seen from polished sections that the hard material or alloy powder is only uniformly distributed in the melting bath if the linear focus has acted on the solution zone for a sufficiently long time. The precise values can be determined experimentally.

The powder material dissolved uniformly in the melt is then subjected in the solidification zone 22 to directional solidification at a cooling rate of 200 to 600 K/sec in the solidification front where the feed rate is between 500 and 10,000 mm/min. In a variant of the method according to the invention the powder is transferred to the surface of the structural member in the gas stream so that a certain quantity of powder can already penetrate into the melting zone as a result of the kinetic energy.

Further tests have shown that the energy beam is preferably split before the zone of incidence where a first part beam is deflected into the heating and melting zone and a second part beam is deflected behind the solidification front for thermal structural treatment. The formation of the structure can be specifically controlled by this method. A device for implementing the method is shown in FIG. 6.

Further control of the structure can be achieved by directing the energy beam in the solidification front at a specific power of <1 kW/mm$^2$ onto the surface of the workpiece. It has been found that the time of action of the energy beam in the melting bath for dissolving and homogeneously distributing the hard material or intermetallic phases lies between 0.01 and 1 second.

Said requirements are met by a $\geq 3$ kW diode laser having an adjustable linear focal width. By this means before the beginning and at the end of a coating the linear focal width of the energy beam can be reduced transverse to the feed direction. The quantity of powder can be controlled similarly so that during a surface treatment only small overlaps of the supplied powder or the incident energy were established.

If the workpiece is constructed as a hollow cylinder, it should preferably rotate about the energy beam in the downhand position so that the energy beam which is held in a fixed position relative to the direction of rotation achieves a continuous direction of feed during the rotation in the direction of the axis of rotation to produce a flat alloying zone. This can be seen from FIGS. 8 to 11 which are explained subsequently and which show a turntable 31, a clamping device 32, and an engine block 33 with a cylinder bore 34.

Powder from a powder store 41 is conveyed into the cylinder bore 34 via a vibrating conveyor chute 30 or screw conveyor 38. The pre-deposited powder layer 35 has a height HP where the vibrating conveyor chute 30 is located at a distance HA above the cylinder in the downhand position. The powder height HF is reached in the vibrating conveyor chute 30.

The vibrating conveyor chute 30 exhibits vibrational excitation 40 at the frequency f. A coupling element 42 to produce the vibrations is also attached to the vibrating conveyor chute 30.

The energy beam is deflected and focussed via a diode laser 43 and a laser optical system 44. The vibrating conveyor chute 30 and diode laser 43 are attached to a mounting plate 46 which rests on a feed slide 45. The feed slide 45 can be moved in and out of the cylinder bore 34 by means of a linear drive. This is indicated by the double arrow in FIG. 8.

Figure 9:
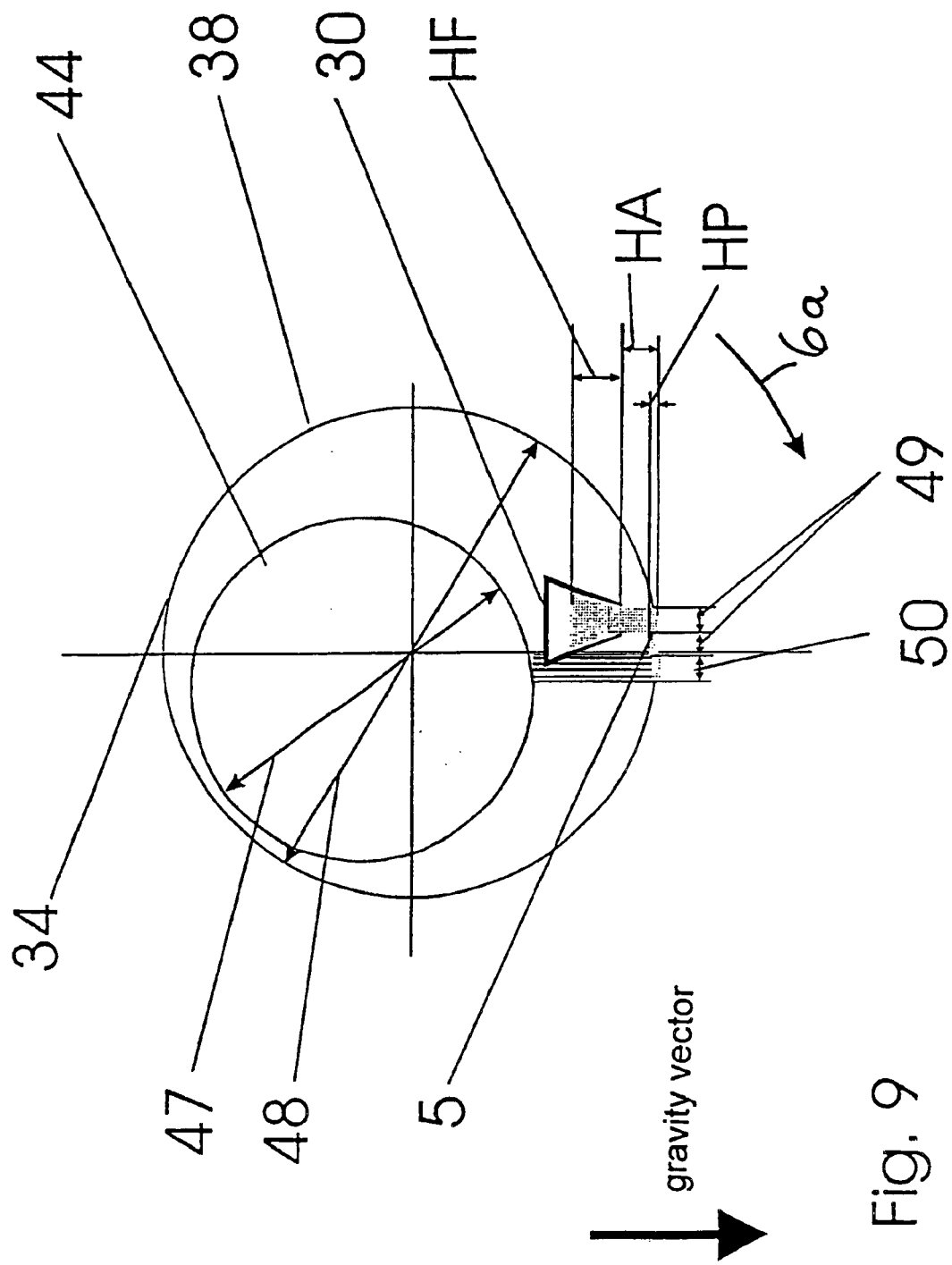

According to FIG. 9 the diameter 47 of the laser optical system is dimensioned so that in the cylinder bore 34 there is still room for the conveyor chute 30. Since the cylinder is processed in the downhand position, the laser beam emerges downwards from the laser optical system 44 whereby a track width 50 of the laser beam is described on the cylinder wall. Next to the laser track the powder is pre-deposited in a track width 49. The bore diameter of the cylinder is denoted by 48.

Devices suitable for the industrial processing of workpieces and structural members were developed to implement the method. For this purpose the device according to FIG. 8 consists of a clamping device 32 on which an engine block 33 is aligned and clamped above index holes 37 and/or via working surfaces. Energy beam devices are moved onto the working surfaces in the direction of the cylinder axis and directed onto the working surface using a focusable bean head and a powder supply. It has bee proved to be especially favourable if the energy bean can be inserted into the workpiece which is located on a turntable 31 with a clamping device 32, where the energy beam is directed as a linear focus from a diode laser optical system 44 perpendicularly onto the workpiece rotating in the downhand position, e.g. an engine block 33.

If several energy beam units, staggered relative to one another, are directed onto the working surface of the workpiece rotating in the downhand position, the energy beam unit should sweep the working surface rectilinearly.

This produces a flat alloying zone which can be dimensioned according to the delimiting device of the system and/or the rotating movement of the structural member.

Advantageously the energy beam units sweep several lines of the working surface simultaneously. As a result the processing times are shortened and the treated surfaces become more uniform.

An alternative to the powder supply via one or several nozzles shown in FIGS. 1 to 6 is explained subsequently. This involves supplying powder by means of a screw conveyor or vibrating device which has proved particularly effective at high temperatures and in narrow cylinder bores.

The thermal radiation at high laser powers is very intensive so that normal nozzle materials located in the vicinity of the laser incidence zone cannot withstand the high temperatures or erode. In addition, the powder irradiated above the nozzle is at high pressure and has a strong effect on the gas flow inside the cylinder bore to be processed. The temperature level and the density of the protective gas change with the gas flow so that the efficiency of the laser is subject to severe fluctuations.

With a vibrating conveyor chute 30 these conditions can be controlled significantly better. The temperature level and the protective gas atmosphere are not adversely influenced during the powder supply via a screw conveyor or conveyor chute. High-strength and temperature-resistant materials can be used for the conveyor chute so that a long-term temperature effect does not trigger any fatigue phenomena or erosion effects.

Processing of the cylinder bore 34 in the downhand position is particularly effective if the powder is supplied via a vibrating chute if this takes place using a pre-deposited powder layer HP as in Claim 1*b*).

Naturally, other conveying devices such as, for example, screw conveyors, conveyor belts or similar can also be used.

Compared with the powder supply in a nozzle, these have the advantage that a track having the width of the laser focal width and a height or layer thickness between 0.3–3 mm can be precisely adjusted.

In order to precisely control the dosing of the powder, mechanical skimmers or brushes are advantageously provided in the vicinity of the deposition zone. The quantity of material can thereby be arbitrarily controlled in width and height. The layer thickness of the deposited powder should preferably be kept in the range of 0.3 to 3 mm where a higher laser energy density is required for a high layer thickness.

An important factor for coupling the laser energy into the powder material is the grain spectrum and the crystal shape of the powder used.

For implementation on an industrial scale there was developed a diode laser 43 with a laser optical system 44 which are located in a fixed position relative to the direction of rotation of the structural member inside the rotatable clamping device 32 connected to a drive unit.

The diode laser with the optical system is moved into the cylinder bore 34 by means of a feed slide 45 together with the powder supply device which is located beside the energy beam. It is also possible to deposit the powder on the surfaces facing the beam. This is achieved as in FIG. 8 by a conveyor chute 30 with which the powder is loosely sprinkled in the direction of gravity. A pre-deposited powder layer 35 is formed where the outlet height HA of the conveyor chute in FIG. 9 is given.

In order to produce spiral or other geometrical guidance for the linear focus the drive unit for the turntable 31 should make it possible to achieve a variable rotation speed. Then the feed slide 45 of the diode laser 43 and the powder supply in the direction of the axis of rotation can be combined with the rotation speed of the engine block 33.

Figure 10:
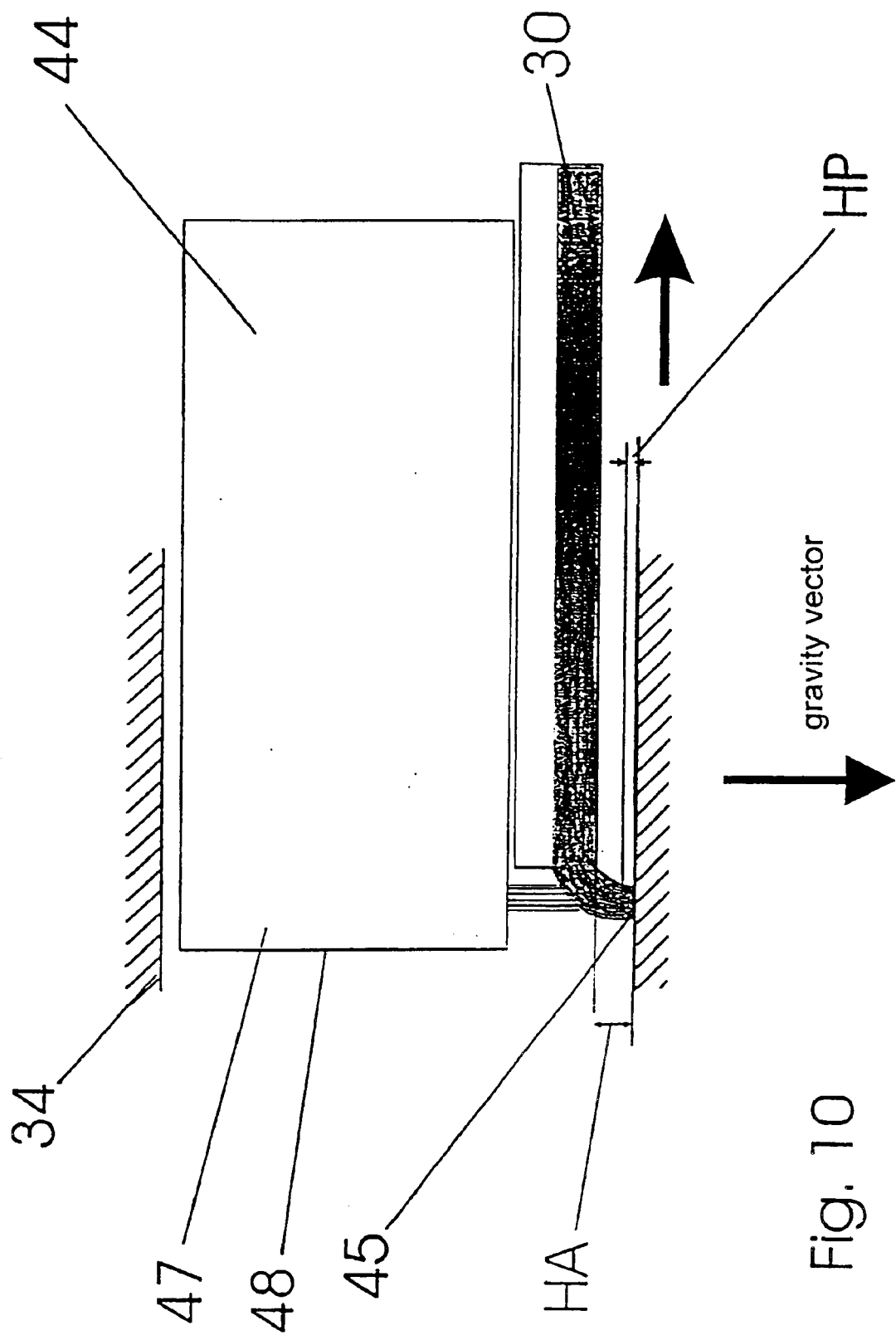
Figure 11:
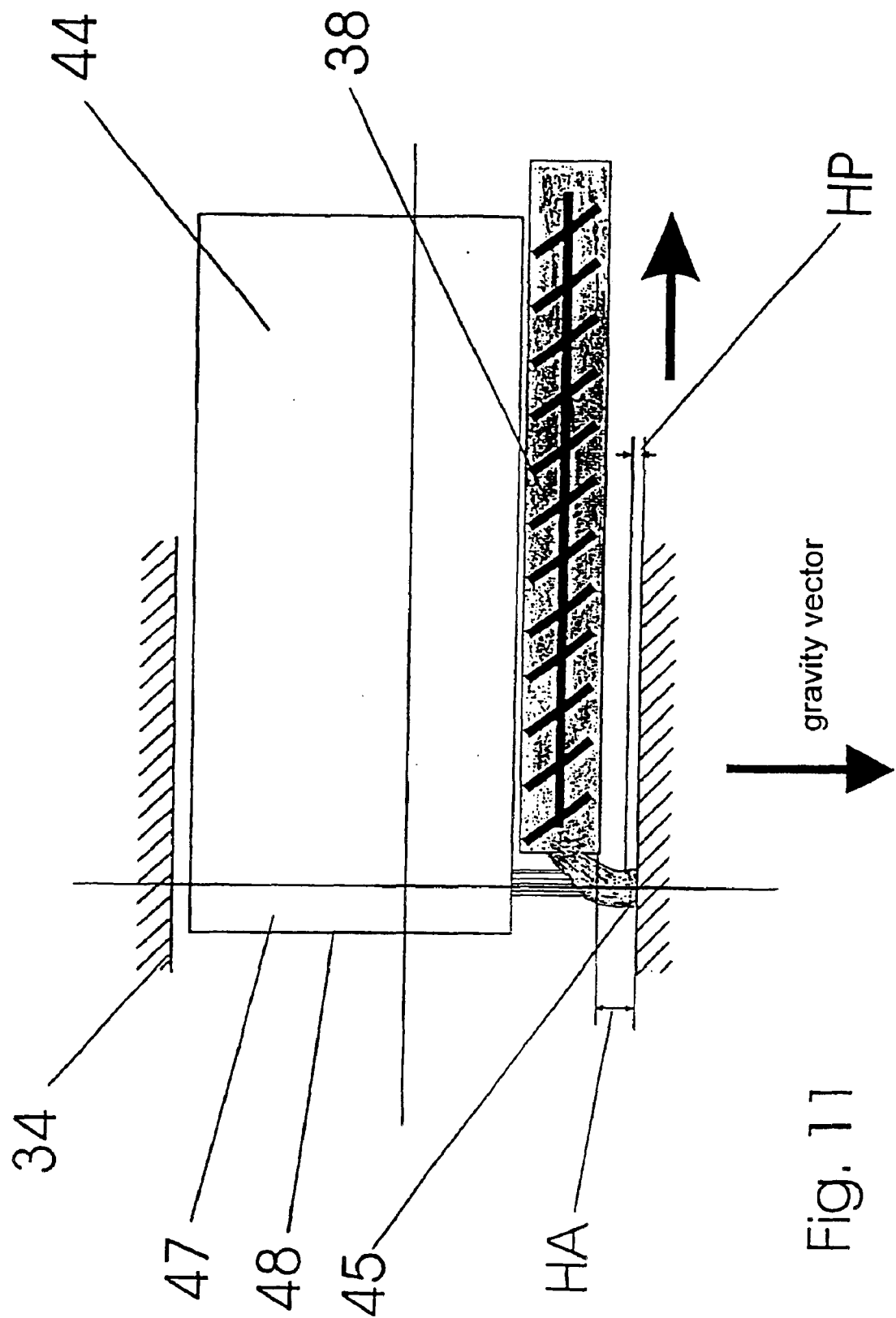

In FIGS. 10 and 11 the vibrating conveyor chute 30 or screw conveyor 38 produces a powder height HP where the distance from the conveyor device is denoted by HA. The cylinder bore 34 accommodates the laser optical system 44 with the bore diameter 48 and both are moved in a feed slide 45 in the direction of the arrow.

The method described can be used to manufacture surface-alloyed cylindrical or partly cylindrical especially hollow cylindrical structural members. They consist of an aluminium matrix casting alloy and a precipitation zone extending as far as the surface of the structural member comprising an aluminium based alloy with precipitated hard phases. Between the matrix and the precipitation zone there is a eutectic zone supersaturated by primary hard phases (supersaturation zone) where the increase in hardness from the matrix to the surface of the structural member takes place stepwise. Especially favourable conditions can be achieved if the matrix alloy of the type AlSiCu or AlSiMg is hypoeutectic and in the supersaturated eutectic transition zone there is an alloy of the type AlSi with finely precipitated primary silicon phases smaller than 1 µm, whereas in the precipitation zone there are primary silicon phases of 2 to 20 µm. Then increases in hardness as far as the surface of the structural member of over 200% can be achieved.

What is claimed is:

1. A method for manufacturing a cylindrical, partly cylindrical or hollow cylindrical surface-alloyed structural member made from a matrix alloy where an energy beam having a linear focus, is directed onto a workpiece surface of a workpiece being moved in front of said energy beam to form a zone of incidence on said workpiece surface wherein the workpiece surface is melted forming a liquified matrix alloy, said method comprising:

a) forming a locally bounded melting bath in which the liquified matrix alloy is present in the zone of incidence of the energy beam, the melting bath having a heating front, a melting front, a solution zone and a solidification front, b) depositing the silicon powder at the side of the energy beam via a conveyor device in the direction of gravity and supplying said silicon powder in coordination with the feed movement of the workpiece in a width which corresponds to the width of the linear focus and producing thereby a layer of silicon powder having a height of 0.3–3 mm, c) heating the silicon powder supplied to the workpiece surface in the heating front of the melting bath with the energy beam at a wavelength of 780–940 nm and thereby dissolving in the melting bath the silicon powder which is in contact with the liquefied matrix alloy, d) producing convection in the solution zone with the energy beam having a specific power of at least $10^4$ W/cm$^2$, so that the homogenization process in the melting bath is accelerated, e) wherein the linear focus acts on the solution zone until the silicon powder is uniformly distributed in the melting bath, f) subjecting the uniformly distributed silicon powder in front of the energy beam, which has gone into solution metallurgically in the solution zone, to directional solidification in the solidification front at a cooling rate of 200–600 K/sec wherein the workpiece is moved at a feed rate of 500–10,000 mm/min.

2. The method according to claim 1, wherein the silicon powder in process steps b)–f) comprises silicon powder with a grain diameter of 40–90 µm.

3. The method according to claim 1, further comprising splitting the energy beam before the zone of incidence with the workpiece surface into a first part beam and a second part beam, wherein the first part beam is deflected into the heating front and melting bath and a second part beam is deflected behind the solidification front after the first part beam for thermal structural treatment.

4. The method according to claim 3 wherein the second part beam is directed behind the solidification front onto the workpiece surface at a specific power of <1 kW/mm$^2$ to control formation of a precipitation structure in the surface-alloyed structural member.

5. The method according to claim 2 wherein the energy beam dissolves and homogeneously distributes primary precipitated Si phases in the melting bath between 0.01 and 1 second.

6. The method according to claim 1, comprising using a $\geqq 3$ kW diode laser with a variable optical system to adjust the linear focal width of 4–15 mm to form the energy beam.

7. The method according to claim 1, comprising reducing the linear focal width of the energy beam transverse to the feed direction before the beginning and at the end of alloying.

8. The method according to claim 1, wherein the workpiece comprises a hollow cylinder which is positioned so that its longitudinal axis is transverse to the direction of gravity and which is rotated about said longitudinal axis during the alloying wherein the energy beam which is held in a fixed position relative to the direction of rotation, performs a continuous feed movement during the rotation in the direction of the axis of rotation to produce a flat alloying zone.

9. The method according to claim 1 wherein at the beginning of alloying, the energy beam has a point structure and continually increases in size together with the quantity of powder until it has reached the complete linear focal width after a rotation of the workpiece.

10. The method according to claim 1 comprising continually reducing to zero the linear focal width and the quantity of powder at the end of the alloying during the last rotation of the workpiece.

11. The method according to claim 1 comprising treating along the longitudinal axis at a depth of up to 200 mm a hollow cylinder made of Al or Mg alloys having a bore diameter of 60–120 mm.

* * * * *